United States Patent
Horiyama

(10) Patent No.: US 9,310,739 B2
(45) Date of Patent: Apr. 12, 2016

(54) PRINTING APPARATUS, METHOD, AND STORAGE MEDIUM FOR CONTROLLING THE DISPLAY OF AN AGGREGATION RESULT OF A NUMBER OF PRINTED PAGES

(71) Applicant: CANON KABUSHIKI KAISHA, Tokyo (JP)

(72) Inventor: Jun Horiyama, Inagi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/657,487

(22) Filed: Mar. 13, 2015

(65) Prior Publication Data
US 2015/0278663 A1    Oct. 1, 2015

(30) Foreign Application Priority Data

Mar. 28, 2014 (JP) ................................ 2014-068843
Dec. 26, 2014 (JP) ................................ 2014-264023

(51) Int. Cl.
| | | |
|---|---|---|
| G06F 3/12 | (2006.01) | |
| G03G 15/00 | (2006.01) | |
| G06K 15/00 | (2006.01) | |
| H04N 1/00 | (2006.01) | |

(52) U.S. Cl.
CPC .............. *G03G 15/50* (2013.01); *G06K 15/005* (2013.01); *H04N 1/00* (2013.01)

(58) Field of Classification Search
None
See application file for complete search history.

(56) References Cited

U.S. PATENT DOCUMENTS

| | | | |
|---|---|---|---|
| 7,155,476 B2 | 12/2006 | Horiyama | |
| 7,426,046 B2 * | 9/2008 | Shirai | G06F 3/0486 358/1.13 |
| 7,436,552 B2 * | 10/2008 | Nozato | G06F 21/608 358/1.1 |
| 8,456,682 B2 | 6/2013 | Yamakawa | |
| 8,472,058 B2 | 6/2013 | Horiyama | |
| 8,508,802 B2 * | 8/2013 | Igarashi | G06F 3/1219 358/1.13 |
| 8,917,412 B2 * | 12/2014 | Kakegawa | G06F 3/1219 358/1.15 |
| 8,982,392 B2 * | 3/2015 | Nakamura | H04N 1/00281 358/1.15 |
| 2008/0112010 A1 * | 5/2008 | Matsuo | H04N 1/32502 358/1.15 |
| 2015/0169270 A1 * | 6/2015 | Watanabe | G06K 15/1823 358/1.13 |

FOREIGN PATENT DOCUMENTS

JP    2009-282947    12/2009

* cited by examiner

*Primary Examiner* — Paul F Payer
(74) *Attorney, Agent, or Firm* — Fitzpatrick, Cella, Harper & Scinto

(57) ABSTRACT

Provided is a printing apparatus that manages a number of printed pages in a single color level and a number of printed pages in monochrome. The printing apparatus includes a receiving unit configured to receive setting information related to displaying an aggregation result of a number of printed pages from a managing apparatus; a displaying unit configured to control displaying an aggregation result of a number of printed pages; and a determining unit configured to determine whether or not the received setting information indicates a first setting to display a first aggregation result of a number of printed pages of each level among a plurality of color levels on an apparatus configured not to manage a number of printed pages of each level among the plurality of color levels. The displaying unit is configured to control to display the first aggregation result in response to a determination result of the determining unit.

17 Claims, 19 Drawing Sheets

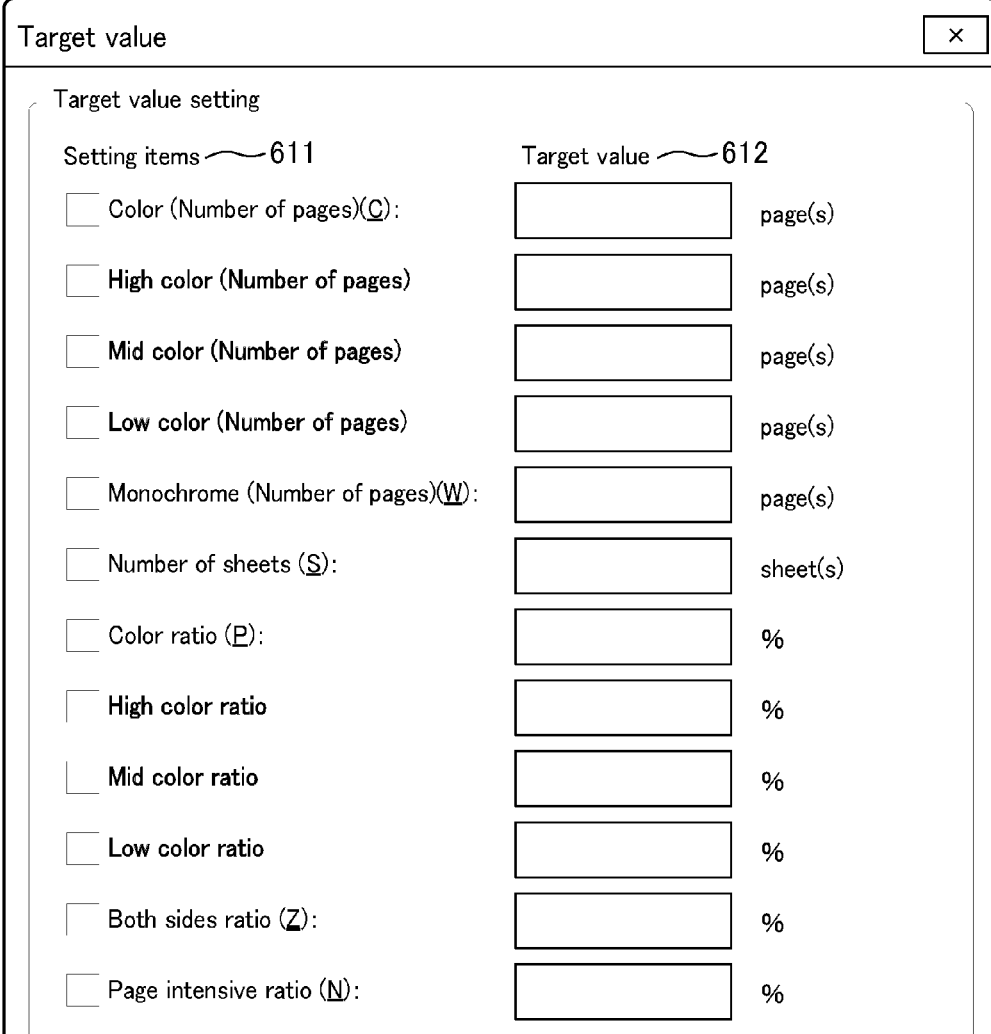

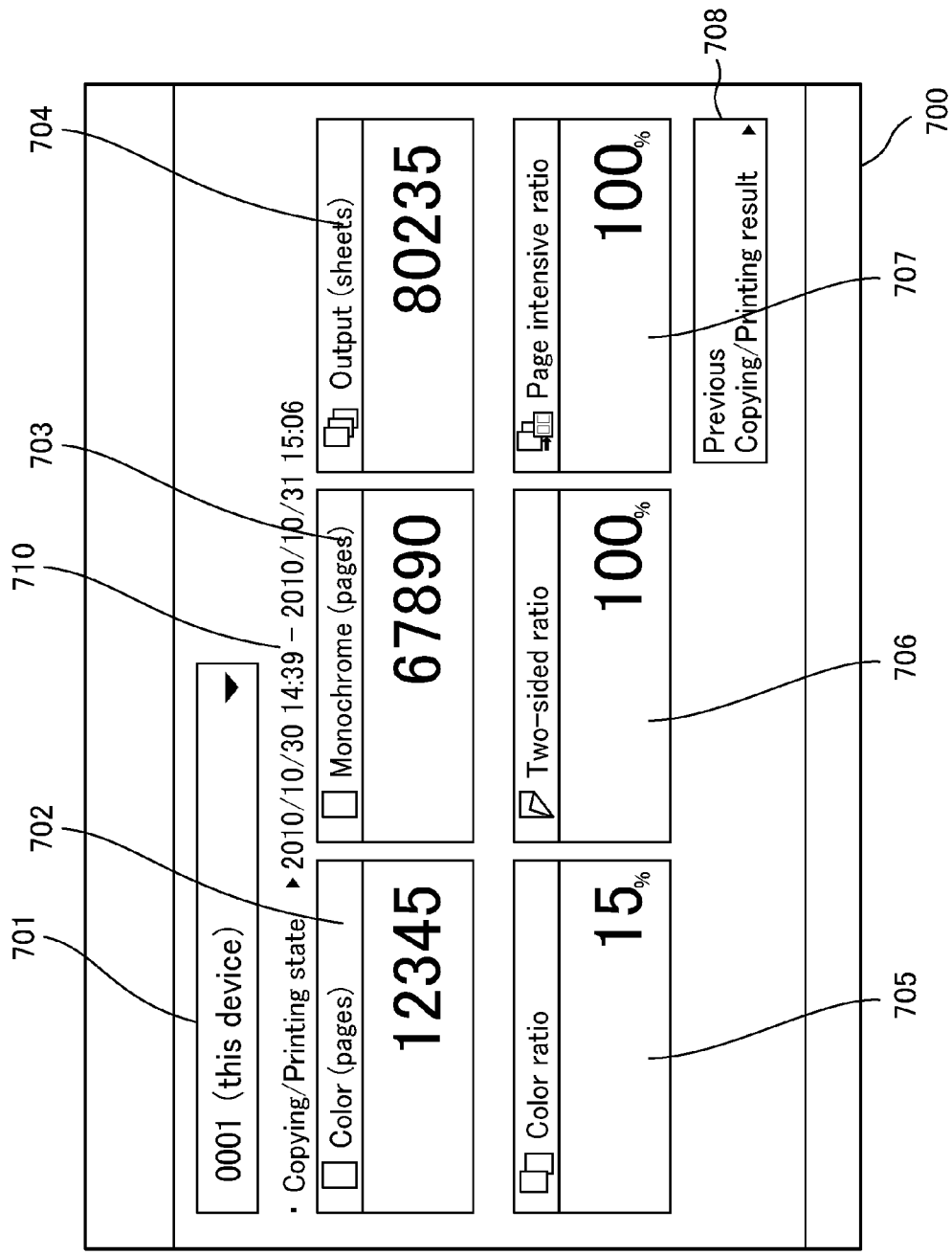

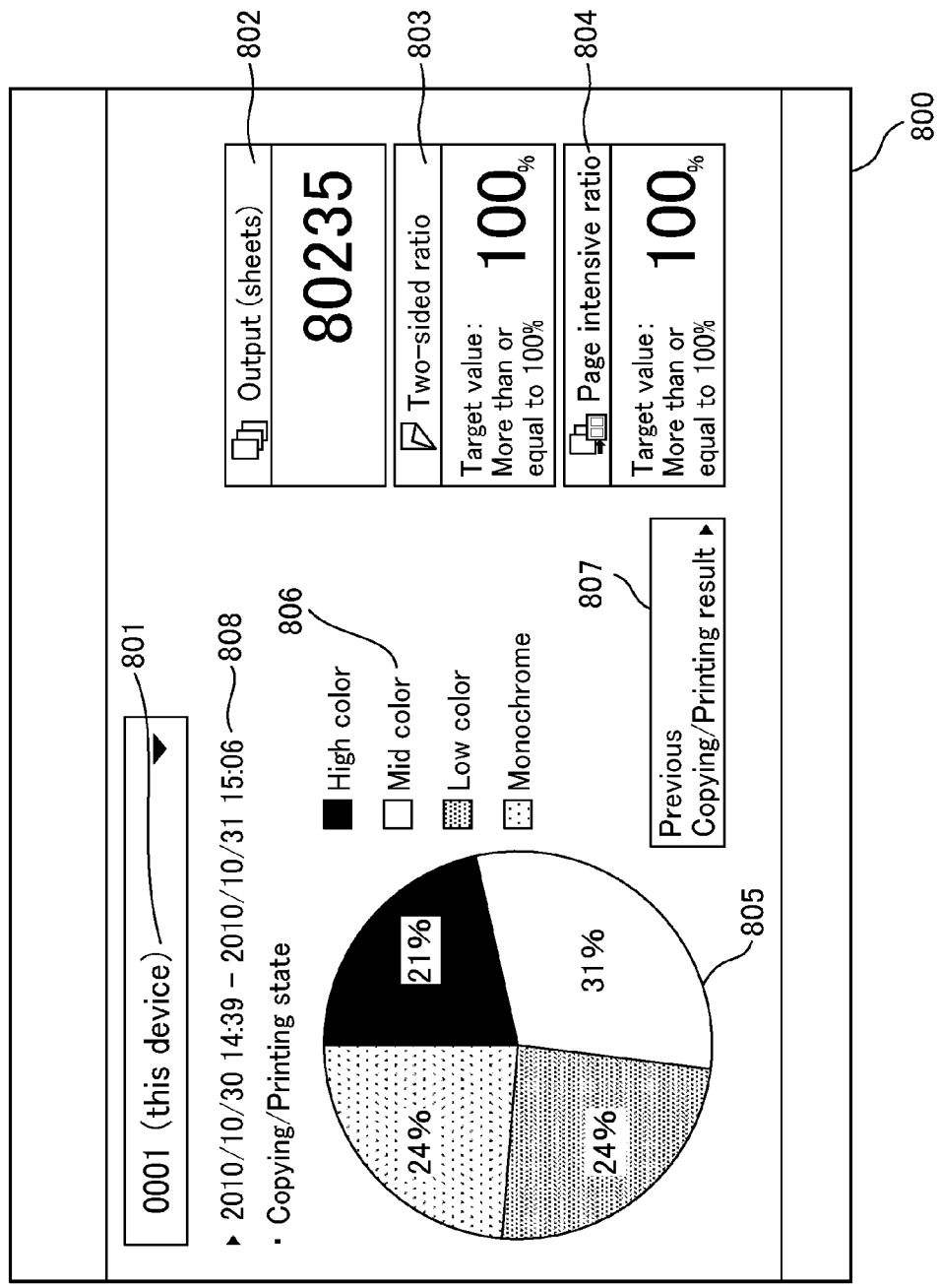

FIG. 13

| 1301 | 1302 | 1303 | 1304 | 1305 | 1306 | 1307 | 1308 | 1309 |
|---|---|---|---|---|---|---|---|---|
| Job history ID | Multi-function peripheral ID | Job type | Start time | End time | Number of color pages | Number of monochrome pages | Number of output sheets | Number of both sides sheets |
| 1000 | Multi-function peripheral A | Copy | 2013/08/25 14:25 | 2013/08/25 14:40 | 12 | 2 | 7 | 7 |
| 1001 | Multi-function peripheral B | Scan | 2013/08/26 9:01 | 2013/08/26 9:01 | 3 | 3 | 3 | 0 |
| 1002 | Multi-function peripheral C | Copy | 2013/08/26 9:10 | 2013/08/26 9:10 | 6 | 2 | 2 | 2 |
| 1003 | Multi-function peripheral D | Print | 2013/08/26 10:12 | 2013/08/26 10:13 | 4 | 0 | 1 | 0 |

| 1301 | 1310 | 1311 | 1312 | 1313 | 1314 | 1315 | 1316 |
|---|---|---|---|---|---|---|---|
| Job history ID | Number of 2in1 pages | Number of 4in1 pages | High color | Mid color | Low color | User name | Department ID |
| 1000 | 0 | 0 | 0 | 4 | 6 | 2 yamada | – |
| 1001 | 3 | 0 | 0 | 0 | 2 | 1 – | 123 |
| 1002 | 4 | 0 | 0 | – | – | – sasaki | – |
| 1003 | 0 | 1 | 1 | 1 | 1 | 2 ito | – |

FIG. 14

| Aggregation period | User name | Number of color pages | Number of monochrome pages | Number of output sheets | Number of both sides sheets | Number of 2in1 pages | Number of 4in1 pages | High color | Mid color | Low color | |
|---|---|---|---|---|---|---|---|---|---|---|---|
| 1401 | 1402 | 1403 | 1404 | 1405 | 1406 | 1407 | 1408 | 1409 | 1410 | 1411 | |
| 2013/9/1/0:00 – 2013/9/26 0:00 | yamada | 30 | 5 | 30 | 5 | 2 | 0 | 0 | 12 | 13 | 5 | 1421 |
| 2013/9/1/0:00 – 2013/9/26 0:00 | sato | 43 | 8 | 42 | 8 | 0 | 0 | 0 | 8 | 14 | 10 | 1422 |
| 2013/9/1/0:00 – 2013/9/26 0:00 | sasaki | 25 | 6 | 18 | 8 | 4 | 1 | 3 | 3 | 10 | 12 | 1423 |
| 2013/9/1/0:00 – 2013/9/26 0:00 | ito | 44 | 13 | 33 | 12 | 3 | 0 | 15 | 13 | 7 | | 1424 |
| 2013/9/1/0:00 – 2013/9/26 0:00 | oda | 10 | 8 | 9 | 9 | 0 | 0 | 0 | 3 | 7 | | 1425 |

FIG. 15

| Aggregation period | Department ID (1501) | Number of color pages (1502) | Number of monochrome pages (1503) | Number of output sheets (1504) | Number of two-sided sheets (1505) | Number of 2in1 pages (1506) | Number of 4in1 pages (1507) | High color (1508) | Mid color (1509) | Low color (1510) | |
|---|---|---|---|---|---|---|---|---|---|---|---|
| 2013/9/1 0:00 – 2013/9/26 0:00 | 100 | 30 | 5 | 30 | 5 | 2 | 0 | 12 | 13 | 5 | 1521 |
| 2013/9/1 0:00 – 2013/9/26 0:00 | 123 | 43 | 8 | 42 | 8 | 0 | 0 | 8 | 14 | 10 | 1522 |
| 2013/9/1 0:00 – 2013/9/26 0:00 | 456 | 25 | 6 | 18 | 8 | 4 | 1 | 3 | 10 | 12 | 1523 |

PRINTING APPARATUS, METHOD, AND STORAGE MEDIUM FOR CONTROLLING THE DISPLAY OF AN AGGREGATION RESULT OF A NUMBER OF PRINTED PAGES

BACKGROUND OF THE INVENTION

1. Field of the Invention

The present invention relates to a printing apparatus, a control method for the printing apparatus, and a storage medium.

2. Description of the Related Art

Recently, a huge amount of printed materials has come to be outputted by image processing apparatuses, such as a printing apparatus. Due to this situation, due to environmental problems or improvements of cost consciousness, a demand to suppress unnecessary color printing output has increased. In response, the image processing apparatus classifies the type of printing output into 2 types, which are "monochrome printing" and "color printing" and has performed aggregations or reports of printing output history. However, recently, methods for reporting a color ratio of each pages of the printing job have been disclosed. (For example, refer to Japanese Patent Laid-Open No. 2009-282947).

However, there is a plurality of image processing apparatuses of different types on a network in the office. More specifically, image processing apparatuses that classify types of printing output into 2 types which are "monochrome printing" and "color printing" and can aggregate or report the printing output histories, and image processing apparatuses that can classify color ratios into levels may be mixed. Thus, in the method disclosed in Japanese Patent Laid-Open No. 2009-282947, there is a difficulty in providing the aggregation results such that each user can always be aware of saving when the each user uses a image processing apparatus that has different managing methods for color printing output history.

SUMMARY OF THE INVENTION

The present invention provides a printing apparatus that displays an aggregation results suitable for each user even if the image processing apparatuses that use different managing methods of printing output history exist together.

According to an aspect of the present invention, a printing apparatus that manages a number of printed pages in a single color level and a number of printed pages in monochrome is provided that includes a receiving unit configured to receive setting information related displaying an aggregation result of a number of printed pages from a managing apparatus; a displaying unit configured to control displaying an aggregation result of a number of printed pages; and a determining unit configured to determine whether or not the received setting information indicates a first setting to display a first aggregation result of a number of printed pages of each level among a plurality of color levels on an apparatus configured not to manage a number of printed pages of each level among the plurality of color levels, wherein the displaying unit is configured to control to display the first aggregation result in response to a determination result of the determining unit.

According to the present invention, even if the image processing apparatuses that use different managing methods of printing output history exist together, a printing apparatus that displays an aggregation result suitable to each user, which makes the user always aware of resource saving, can be provided.

Further features of the present invention will become apparent from the following description of exemplary embodiments with reference to the attached drawings.

BRIEF DESCRIPTION OF THE DRAWINGS

FIGS. 6A and 6B are diagrams illustrating exemplary displays of setting screens of the image processing apparatus.

FIG. 7 is a diagram illustrating an exemplary display of an aggregation screen of the image processing apparatus.

FIG. 8 is a diagram illustrating an exemplary display of the aggregation screen of the image processing apparatus.

FIG. 10 is a block diagram illustrating a hardware configuration of a managing apparatus and the like.

FIG. 11 is a block diagram illustrating a software configuration of the managing apparatus and the like.

FIG. 13 is a table illustrating an exemplary table of job history information held in the managing apparatus.

FIG. 14 is a table illustrating an example of a user counting table held in the managing apparatus.

FIG. 15 is a table illustrating an example of a department ID counting table held in the managing apparatus.

DESCRIPTION OF THE EMBODIMENTS

Hereinafter, embodiments of the present invention will be described with reference to the drawings.

Figure 1:
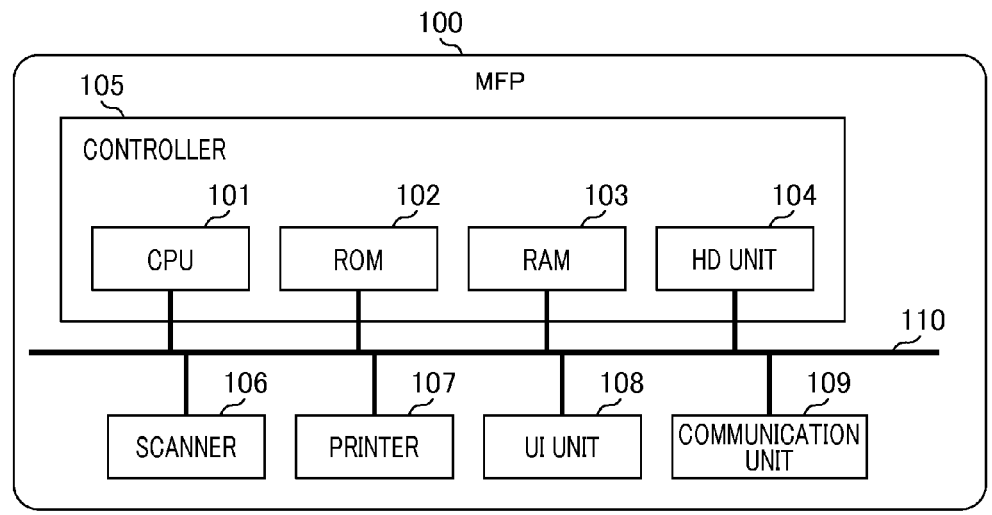
FIG. 1 is a block diagram illustrating a hardware configuration of an image processing apparatus.

Firstly, a description will be given of an image processing apparatus according to the present embodiment by referring to FIG. 1. FIG. 1 is a block diagram illustrating a hardware configuration of an MFP 100, which is an example of the image processing apparatus. The MFP 100 is an apparatus that includes a plurality of functions such as copying, printing, scanning, and the like. In the present embodiment, the MFP 100 may be a printer (printing apparatus) or a multi-function peripheral, which has printing function, displaying function, and the like.

In FIG. 1, a controller 105 controls the MFP 100 device as a whole. As an internal configuration of the controller 105, a CPU 101 is a central processor and performs control of the controller 105, arithmetic processing, and the like. A ROM 102 is a read-only memory and a storage area of a system starting program and the like. A RAM 103 is a random-access memory and a data storage area that has no use restriction. A HD unit 104 is a nonvolatile storage device such as hard disk or SRAM and the like. The RAM 103 is an area which an operating system or a communication control or engine control programs and the like is loaded and executed, or data is stored. A scanner 106 performs an image reading operation. A printer 107 performs printing operation controlled by the controller 105. An UI unit 108 is an operating unit that accepts an instruction from a user, or performs the display of various types of information. A communication unit 109 performs network communication control and is capable of communicating with other image processing apparatuses or computers. A system bus 110 is a passage between the aforementioned components for data.

Figure 2:
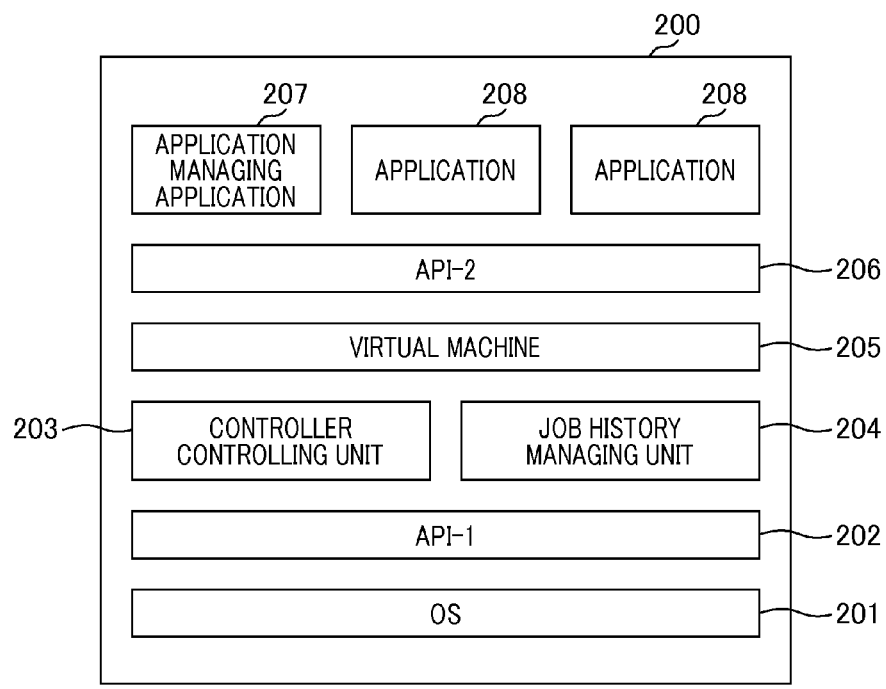
FIG. 2 is a module configuration diagram illustrating a software configuration of the image processing apparatus.

FIG. 2 is a module configuration diagram of the software and the like of the MFP 100 according to the present invention. An operating system (OS) 201 manages/controls the resources of the entire MFP 100. An API-1 (202) is an interface for an application which operates on the OS 201. An application 208 can access the resource on the MFP 100 or can execute a command by the CPU 101 through API-1 (202). A controller controlling unit 203 operates on the OS 201 and controls the scanner 106, printer 107, the operating unit 108 and the like.

A job history managing unit 204 manages the history of a job executed on the MFP 100 such as copying, printing, scanning, faxing and the like. The job history can be sent in response to a request from the managing apparatus. A virtual machine 205 is an optimum execution environment for executing a specific application, and for example, it is realized by the virtual machine of Java (R). An API-2 (206) is an interface for applications that operate on the virtual machine 205 to utilize the controller controlling unit 203, the job history managing unit 204, the API-1 (202) and the like. An application managing application 207 manages applications that operate on the virtual machine 205. The application managing application 207 performs control for downloading, uploading, deleting, and validating and invalidating the application, which are described below.

An application 208 is an application that operates on the virtual machine 205. In the present embodiment, any number of applications having any functions can be installed in the MFP 100 and can be operated as required. The application described here includes an application that performs the aggregation of a number of output sheets and the like of image processing and printing or performs the display of the aggregation result (operates as an aggregation function), such as an application described below. Here, each of the programs corresponding to the applications are stored in the ROM 102 or HD unit 104, and are loaded on the RAM 103 when the MFP 100 is started to thereby realize the functions of the applications.

Figure 3:
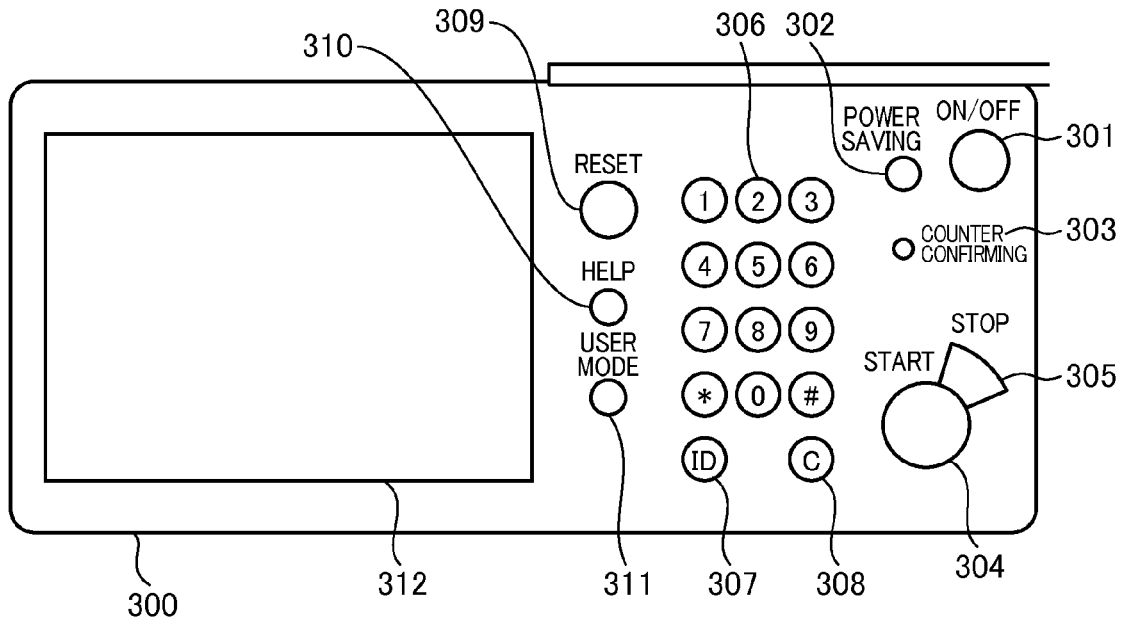
FIG. 3 is a diagram illustrating an example of an operating unit of the image processing apparatus.

FIG. 3 illustrates an example of a user interface provided by the UI unit 108. A key input unit 300 can accept a user operation by a hard key. An ON/OFF button 301 is a power switch. A power saving key 302 is a button that shifts to a power saving mode when pressed. The power saving mode is a state that suppresses power consumption of the whole device by stopping power supply to some parts. A counter confirming key 303 is a button which displays a value of a charging counter to a touch panel 312 when pressed.

The touch panel 312 displays the aggregation result of printing and copying and the like described below. A start key 304 provides the instruction for the start of processing provided by the MFP 100, such as copying/printing/scanning/sending and the like. A stop key 305 stops the processing that has been started by the start key 304. A ten-key 306 inputs numerical information. An ID key 307 provides instructions to input authentication information. A clear key 308 releases information that has been input by the ten-key 306. A reset key 309 releases all parameters for which instructions are provided by the user to the job to be processed. A help key 310 is pressed by the user when the operation is not clear and the touch panel 312 thereby displays information that helps the operation. A user mode key 311 is a key to start various settings. The touch panel 312 includes a display function and a touch panel function, and accepts input from an operator (the user) by detecting whether or not a display area is pressed.

Figure 4:
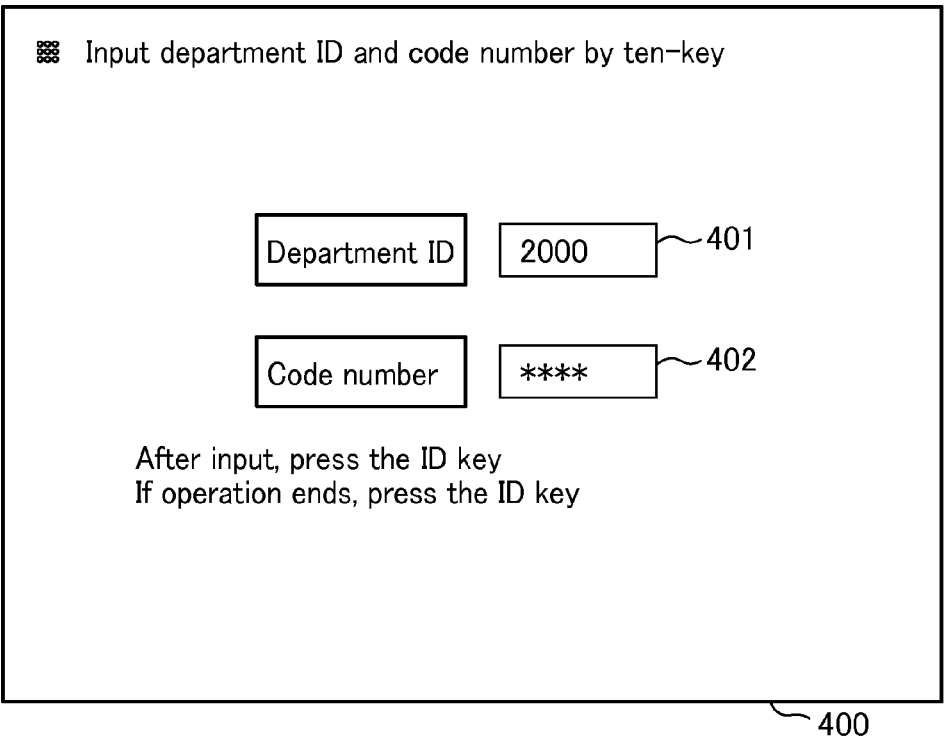
FIG. 4 is a diagram illustrating an exemplary display of a login screen of the image processing apparatus.
Figure 5:
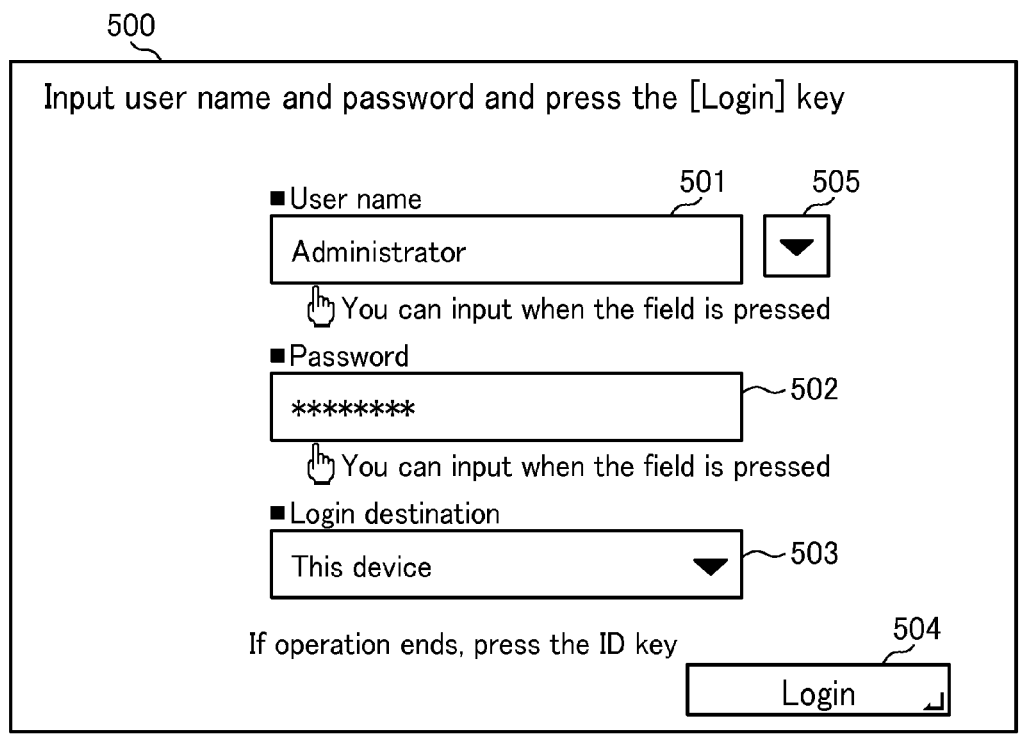
FIG. 5 is a diagram illustrating an exemplary display of the login screen of the image processing apparatus.

FIGS. 4 and 5 are examples of screens displayed on the touch panel 312 of the MFP 100, and there are exemplary login screens using user information (the department ID or the user ID and the like). The user can arbitrarily set which of the login screens is displayed to perform login control.

In FIG. 4, a department authentication screen 400 is a screen to perform authentication of each of the department. The MFP 100 displays this screen after starting and controls the login of each of the departments. In a department ID input text box 401 and a code number input text box 402, an arbitrary character string is input by the key input unit 300. When the ID key 307 is pressed after the department ID and the personal identification number has been input, collation processing is performed by the input department ID and the personal identification number. After the confirmation that the department ID and the personal identification number are correct, an aggregation screen 700 described below in FIG. 7 is displayed. If the department ID and the personal identification number are not correct, the department authentication screen 400 is displayed by emptying the department ID input text box 401 and the code number input text box 402 (in other words, in initial state).

In FIG. 5, a user authentication screen 500 is a screen to perform authentication for each of the users. The MFP 100 displays this screen after starting, and controls the login of each of the users. In a user ID input text box 501 and a code number input text box 502, an arbitrary character string is input by the key input unit 300. When the login key 504 is pressed after the user ID and the personal identification number have been input, collation processing is performed by the inputted user ID and the personal identification number. After the confirmation that the user ID and the personal identification number are correct, the aggregation screen 700 is displayed. If the user ID and the personal identification number are not correct, the user authentication screen 500 is displayed by emptying the user ID input text box 501 and the code number input text box 502 (in other words, in initial state). A login destination selecting button 503 enables setting where the authentication is performed during login. In the present embodiment, it is possible to select whether the MFP 100 itself performs the authentication or the authentication is performed by an authentication server 903.

FIG. 6 is a diagram illustrating an exemplary GUI (Graphical User Interface) of the application which operates on a client computer 903. This application is stored in the HD unit 104, loaded to the RAM 1003 and thereby executed. Furthermore, this application operates to change the settings of the application 208, which operates on plurality of the MFP 100 through a network 910.

Figure 6A:
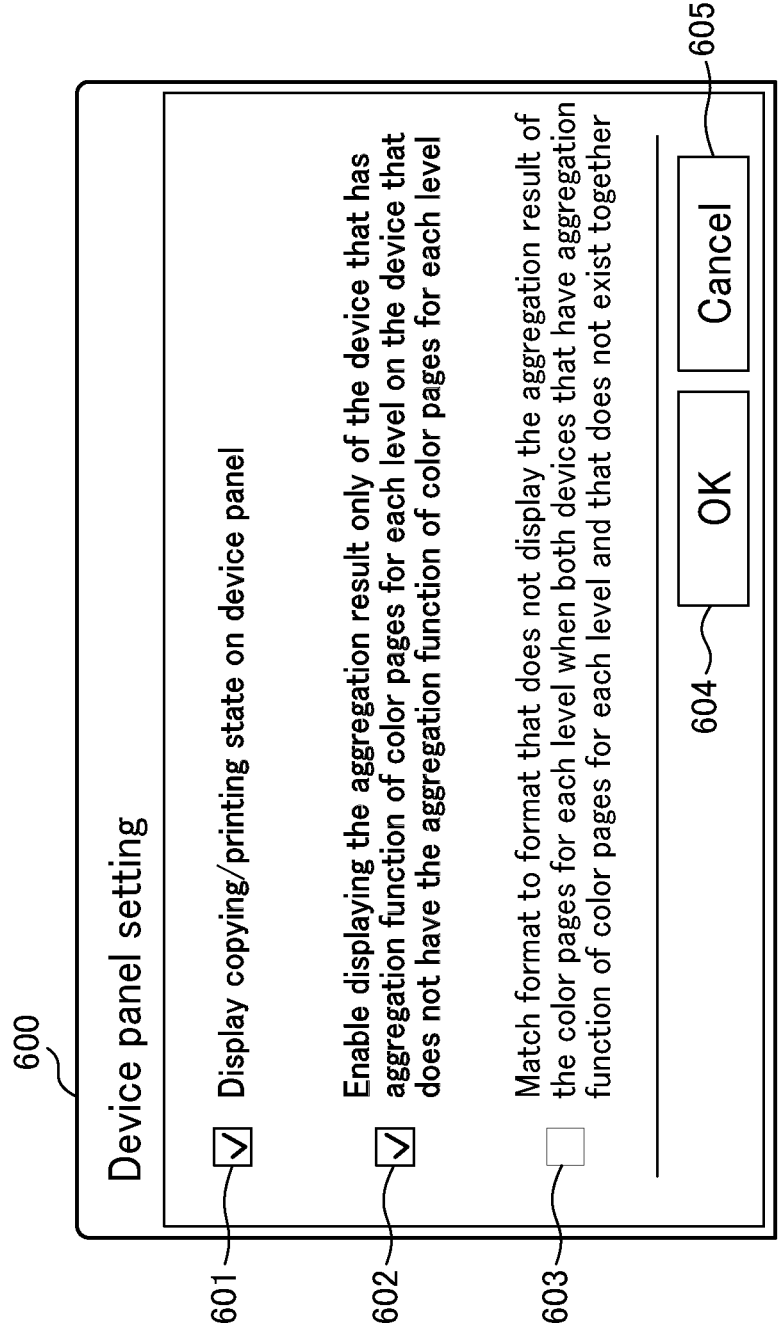

In FIG. 6A, a GUI 600 illustrates one of the GUI of the application and a checkbox 601 is a checkbox for setting whether or not to display to display the aggregation screen described below in FIG. 7 and FIG. 8 on the touch panel 312 of the MFP 100. A checkbox 602 is a setting for indicating a displaying method when it is switched to display the aggregation result of the login user (or the department) of the plurality of the MFPs 100 on the network 910. More specifically, the checkbox 602 is a setting for enabling displaying the aggregation result only of the MFP 100 (new device) that has the aggregation function of color pages for each level on the touch panel 312 of the MFP 100 (old device), which does not have the aggregation function of color pages for each level (first setting). The checkbox 603 is a checkbox for setting the display format of the aggregation result, as shown in FIG. 7, so as to match the format that does not display the aggregation result of the color pages for each level, when both the new device and the old device exist on the network 910 (second setting). A button 604 is a button to for determining the setting of the checkboxes 601 to 603 and for distributing the settings to each of the MFPs 100. A button 605 is a button for cancelling the setting.

In FIG. 6B, a GUI 610 illustrates one of the GUI of the application and can set a target value for each of the various aggregation results of the MFP 100. This is effective to inform the user to suppress useless uses by displaying an actual result value against the target value on the touch panel 312 of the MFP 100. Items 611 indicate items for setting the target values, and by selecting the checkbox, edit boxes 612 become capable of inputting the target values. By the setting items, a number of pages, a number of sheets, and percentages can be set as target values. A button 613 is a button for determining the settings of the items 611 and the edit boxes 612 and for distributing the settings to each of the MFPs 100. A button 614 is a button for cancelling the settings. By displaying the aforementioned target values together with the aggregation result described below in FIGS. 7 and 8, it is possible to make the user aware of saving.

FIG. 7 is a diagram illustrating an example of the aggregation screen which is displayed on the touch panel 312 after login. A combo box 701 is a combo box for switching the object of the aggregation result to be displayed. If a value of the setting item is changed, the combo box 701 switches to display the aggregation result of the login user (or the department) or to display the aggregation result of all users that are using this MFP 100. Furthermore, it is possible to switch the object so as to acquire the aggregation result of the login user (or the department) of all of the MFPs 100 on the network 910 from the managing apparatus 901 and to thereby display them. Also, by the settings shown in FIG. 6, it is possible to switch the object so as to display the aggregation result of only the device that has the aggregation function of color pages for each level. On this screen, the aggregation result based on the user ID or the department ID acquired by the aforementioned login screen (FIG. 4 and FIG. 5) is displayed. Thus, it is always possible to make the user aware of the appropriate cost in accordance with the user which has logged in for performing some processing.

An aggregation period 710 displays a aggregation period of the job information of copying, printing, scanning, faxing and the like. In the present embodiment, the aggregation period 710 is displaying the aggregation period of copying and printing. The color printing aggregation result 702 displays the aggregation result of logical pages (color pages) that the color printing has been performed during the period displayed in the aggregation period 710. In the present embodiment, the result of aggregation of the number of logical pages that have been output in color by printing, copying, fax receiving, reporting, and box printing is displayed as the aggregation result.

A monochrome printing aggregation result 703 displays the aggregation result of logical pages that the monochrome printing has been performed during the period displayed in the aggregation period 710. In the present embodiment, the result of aggregation of the number of logical pages that have been output in monochrome by printing, copying, fax receiving, reporting, and box printing is displayed as the aggregation result. A number of output sheets 704 displays a total number of sheets that have been output (number of physical sheets) during the period displayed in the aggregation period 710. A color ratio 705 displays a color ratio, which is a ratio of color pages to a total number of logical pages which have been output during the period displayed in the aggregation period 710. In the present embodiment, it is calculated as [color ratio=the number of color pages/the total number of logical pages]. A two-sided ratio 706 displays a value that a number of output sheets that have been output using both sides divided by the total number of sheets that have been output, during the period displayed in the aggregation period 710. More specifically, it is calculated as [two-sided ratio=the number of output sheets on two sides/the total number of output sheets]. A page intensive ratio 707 indicates a ratio of a number of pages which have been printed in intensive printing of Nin1 (2in1, 4in1, and the like) to the total number of pages during the period displayed in the aggregation period 710. In the present embodiment, it is calculated as [page intensive ratio=the number of pages set as Nin1/the total number of pages]. Information for making the user recognize the number of output sheets that have been saved by the two-sided printing and the intensive printing may be displayed on the screen. In this case, the total number of output sheets should be divided by the total number of logical pages.

Also in the present embodiment, although the aggregation result and the ratio are displayed by numerical values, they may be displayed on the screen in a graph format such as a bar chart, a pie chart, and the like, or in a table format. When a previous copying/printing result button 708 is selected, the aggregation result during a period before the period displayed in the aggregation period 710 will be displayed.

FIG. 8 is an example of the aggregation screen that is displayed on the touch panel 312 after login. A combo box 801 is a combo box for switching the object of the aggregation result to be displayed. An aggregation period 808 displays the aggregation period of copying, printing, scanning, faxing and the like. A number of output sheets 802 displays the total number of sheets that have been output (number of physical sheets) during the period displayed in the aggregation period 808. A two-sided ratio 803 displays a value of the number of output sheets that have been output on two-sides divided by the total number of sheets that have been output, during the period displayed in the aggregation period 808. A page intensive ratio 804 indicates a ratio of the number of pages that have been printed in intensive printing of Nin1 (2in1, 4in1, and the like) to the total number of pages during the period displayed in the aggregation period 808. When a previous copying/printing result button 807 is selected, the aggregation result during a period before the period displayed in the aggregation period 808 will be displayed.

A graph 805 represents the aggregation result for each level (high color, mid color, low color), which are based on a ratio of color to the logical pages that have been printed and the aggregation result of logical pages that the monochrome printing has performed, during the period displayed in the aggregation period 808. In the preset embodiment, the result of the aggregation of the number of logical pages that have been outputted by printing, copying, fax receiving, reporting, box printing and the like is displayed as the aggregation result. A legend 806 indicates a legend of the graph.

In the following description, an exemplary MFP that does not have the aggregation function of color pages for each level (which manages the number of printed pages in single color level and the number of printed pages in black and white) is regarded as an MFP of an old specification (called as "old device"). Also, an exemplary MFP that has the aggregation function of color pages for each level (which manages the number of printed pages for each level among a plurality of color levels and the number of printed pages in black and white) is regarded as an MFP of new specification (called as "new device").

Figure 9:
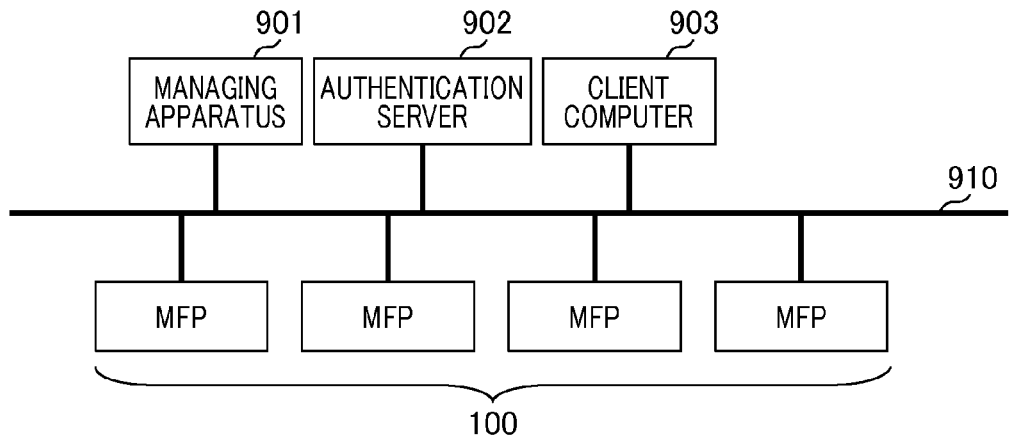
FIG. 9 is a diagram illustrating an example of a network configuration according to an exemplary embodiment of the present invention.

FIG. 9 illustrates a network configuration according to the present embodiment. The managing apparatus 901 that manages the job information, an authentication server 902, the client computer 903, and a plurality of the MFPs 100 are arranged on a system bus 910. The managing apparatus 901 acquires a history of processing (job log information) of copying, printing, scanning, faxing, and the like from the plurality of the MFPs 100. The authentication server 902 performs sending and receiving the authentication information (an ID and a password) when the MFP 100 performs authentication processing by an external server. The client computer 903 distributes setting information to the application 208 of the MFP 100.

Figure 10:
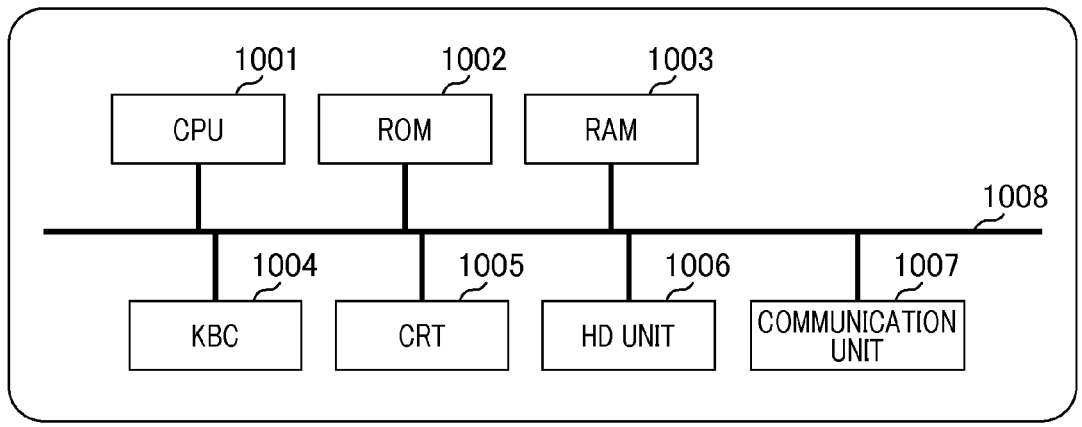

FIG. 10 is a block diagram illustrating the hardware for an information processing apparatus such as the managing apparatus 901, the authentication server 902, and the client computer 903. A CPU 1001 is a central processor and performs control of the entire information processing apparatus, arithmetic processing and the like. A ROM 1002 is a read-only memory and a storage area for information of a system starting program and the like. A RAM 1003 is a random-access memory and a data storage area that has no use restriction. Also the RAM 1003 is an area in which OS, application, programs of a device driver, a communication control and the like are loaded and executed. A KBC 1004 is a keyboard controlling unit and receives input data input from the keyboard and transmits the input data to the CPU. A CRT 1005 is a display controlling unit and performs the display control of the display device. A HD unit 1006 is an external storage device configured by an HD (hard disk), and stores programs and data to be referred to or loaded on the RAM 1003 when needed at run time. The external storage device may be a nonvolatile storage device, for example, SRAM and the like. A communication unit 1007 performs network communication control and is capable of communicating with other information processing apparatuses or peripheral devices connected to the network. A system bus 1008 is a passage between the aforementioned components for data.

Figure 11:
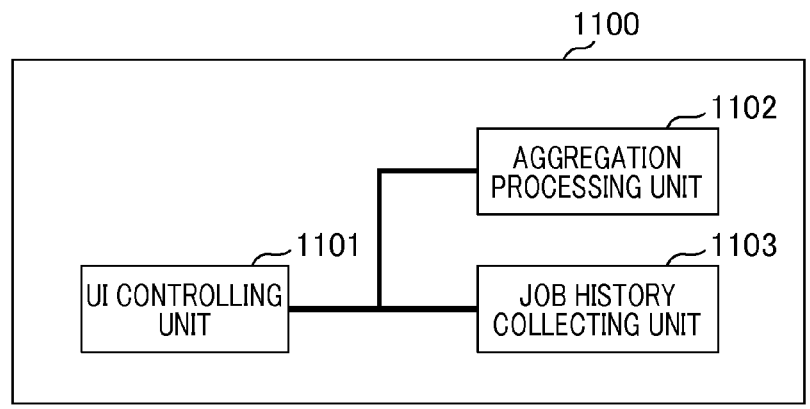

FIG. 11 is a block diagram illustrating software of an information processing apparatus such as the managing apparatus 901, the authentication server 902, and the client computer 903. A UI controlling unit 1101 sends setting screen information of the managing apparatus 901 and receives setting information in response to a request from a host computer (not illustrated) via the communication unit 1007. A job history collecting unit 1103 communicates with the job history managing unit 204 of the plurality of the image forming apparatuses via the communication unit 1007, collects the job history of copying, printing, scanning, faxing and the like, and stores them. An aggregation processing unit 1102 refers to the job history collected by the job history collecting unit 1103 and performs aggregation for each user ID and department ID. The aggregation processing unit 1102 performs aggregation processing of color pages, monochrome pages, the number of output sheets, the number of output sheets output in a two-sided sheet, the number of pages printed in the intensive printing of Nin1 (2in1, 4in1, and the like), a number of pages of high color, mid color, low color, and the like.

Figure 12:
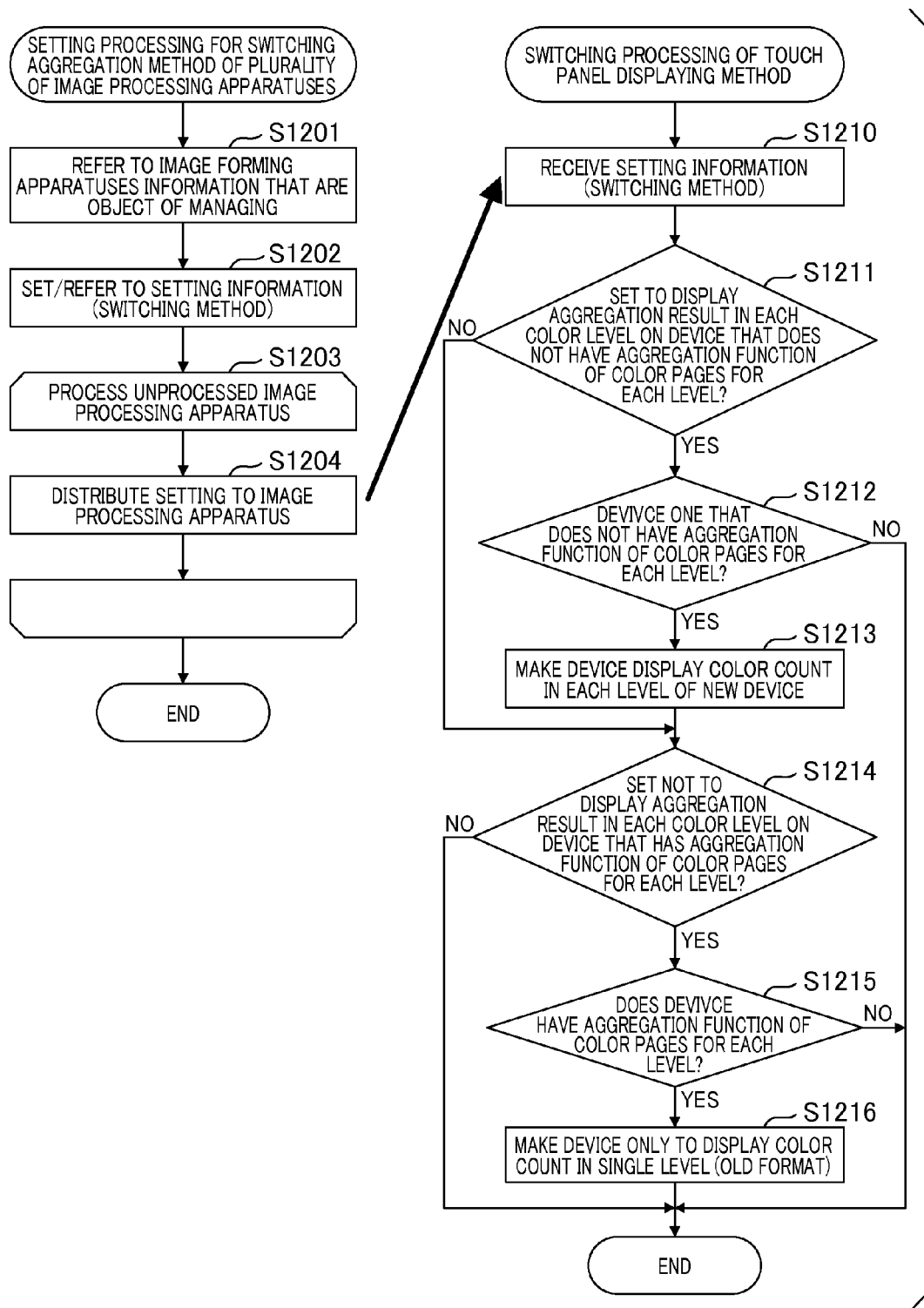
FIG. 12 is a flowchart illustrating a processing for a setting change of the image processing apparatus.

FIG. 12 is a flowchart illustrating a processing in which the client computer 903 changes the settings of the application 208 that operates on the plurality of MFP 100. Also, a flowchart is shown that illustrates the MFP 100 that has received the setting information changes the setting of the application 208 in response to the setting information. Firstly, in step S1201, the client computer 903 refers to the setting information of the plurality of MFPs 100 held in the HD unit 1006. Next, in step S1202, the client computer 903 accepts the change of the setting information of the plurality of MFPs 100 held in the HD unit 1006. Note that the setting change is performed by using the GUI 600 and the GUI 610 shown in FIG. 6. Next, in step S1203, the client computer 903 repeats the processing of step S1203 when there is an MFP 100 in which the setting that has been changed is yet to be processed. In step S1204, the changed setting information is sent to the MFP 100 via the network 910.

Next, a description will be given of the processing of the application 208 that operates on the MFP 100. In this processing, controlling the display of the aggregation result displayed on the touch panel 312 is performed according to the determination result of whether or not the checkbox 602 or 603 shown in FIG. 6A is selected.

Firstly, in step S1210, the application 208 that operates on the MFP 100 receives the setting information from the application that operates on the client computer 903. Next, in step S1211, the application 208 determines whether or not the checkbox 602 shown in FIG. 6 is selected. In other words, it is determined whether or not "it is possible to display the aggregation result only of the device that has the aggregation function of color pages for each level on the device that does not have the aggregation function of color pages for each level". If the checkbox 602 is not selected (No), the processing proceeds to step S1214. In contrast, if the checkbox 602 is selected (Yes), in step S1212, the application 208 of an MFP 100 that has received the setting information determines whether or not the MFP 100 is a device (old device) that does not have the aggregation function of color pages for each level. If it is an MFP 100 (new device) that has the aggregation function of color pages for each level (No), then the processing ends. In contrast, if it is an MFP 100 (old device) that does not have the aggregation function of color pages for each level (Yes), then the processing proceeds to step S1213. In step S1213, the application 208 decides that the aggregation result of color pages for each level of the MFP 100 (new device) that has the aggregation function of color pages for each level can be displayed on the touch panel 312.

Next, in step S1214, the application 208 determines whether or not the checkbox 603 shown in FIG. 6 is selected. In other words, it is determined that whether or not "when both a device that has the aggregation function of color pages for each level and a device that does not exist, the format is matched to the format that does not display the aggregation result of color pages for each level". If the checkbox 603 is not selected (No), the processing ends. In contrast, if the checkbox 603 is selected (Yes), in step S1215, the application 208 of the MFP 100 that has received the setting information determines whether or not the MFP 100 is a device that has the aggregation function of color pages for each level (new device). If it is an MFP 100 that does not have the aggregation function of color pages for each level (old device), (No), then the processing ends. If it is an MFP 100 that has the aggregation function of color pages for each level (new device), (Yes), in step S1216, the application 208 decides that the aggregation result of color pages for single level can be displayed on the touch panel 312.

(Job History Information Table)

FIG. 13 is a table illustrating a job history information table held in the job history collecting unit 1103. In FIG. 13, a job history ID 1301 is an ID that uniquely identifies the job history in the system. A multi-function peripheral ID 1302 is information for identifying a multi-function peripheral and, for example, a MAC address or an IP address may be used. A job type 1303 may be a print that is printing from the host, copy, scan, box print that is printing the document stored in the multi-function peripheral. A start time 1304 is a start time of the job. An end time 1305 is an end time of the job. In a number of color pages 1306, the number of pages that the color printing has been performed by the job is recorded. In a number of monochrome pages 1307, the number of pages that the monochrome printing has been performed by the job is recorded. In a number of output sheets 1308, the number of sheets that has been printed by the job is recorded. In a number of two-sided sheets 1309, the number of sheets that the two-sided printing has been performed by the job is recorded. In a number of 2-in-1 pages 1310, the number of pages that the 2-in-1 printing has been performed by the job is recorded. In a number of 4-in-1 pages 1311, the number of pages that the 4-in-1 printing has been performed by the job is recorded. A high color 1312, a mid color 1313, and a low color 1314 are the number of pages that are classified by ratios of color printing ranges in 1 page, and the number of pages classified in 3 levels, which is high color, mid color, and low color in descending order of the ratio, are recorded. A user name 1315 indicates which users' job histories are of each row. A department ID 1316 indicates which job histories of the department ID are of each row. By this information, the job history information, which is information about who, when, and what job has been started and ended, is recorded.

For example, a job history 1321 indicates that the user name "yamada" has started a copying job on multi-function peripheral A at 2013/08/25 14:25, and has ended it at 2013/08/25 14:40. Furthermore, this job history 1321 indicates that 12 pages of color printing and 2 pages of monochrome printing have been performed, the number of output sheets is 7 sheets, and the number of two-sided sheets output is 7 sheets. Also, it indicates that among 12 pages of color printing, the number of pages of high color is 4 pages, the number of pages of mid color is 6 pages, and the number of pages of low color is 2 pages. A job history 1322 indicates that this job history is for not a user but is for the department for which the department ID 1316 is "123". For example, a job history 1323 indicates that the number of pages of high color, the number of pages of mid color, and the number of pages of low color could not be acquired. Based on this fact, it indicates that the multi-function peripheral C is an old device. A job history 1324 indicates that the user name "ito" has performed a printing job on multi-function peripheral D, which is only a color printing. Note that the job history information table can be configured to be generated by each job type.

(Counting Table)

FIG. 14 is a table illustrating a user counting table held in the aggregation processing unit 1102. And FIG. 15 is a table illustrating a department ID counting table held in the aggregation processing unit 1102. The aggregation processing unit 1102 performs aggregation processing according to the setting of the aggregation period set in advance, and stores the aggregation result into the counting tables shown in FIG. 14 and FIG. 15.

Since FIG. 14 and FIG. 15 only differ in the user name 1402 and department ID 1502, and other parts are shared, FIG. 14 and FIG. 15 are described together. The aggregation periods 1401 and 1501 are calculated based on the aggregation period set in advance, and indicate a start date and an end date of the aggregation period. The aggregation period 1401 is displayed as the aggregation period 710 shown in FIG. 7 or the aggregation period 808 shown in FIG. 8. A user name 1402 indicates which users aggregation results belong to each row. The aggregation processing unit 1102 adds each of the number of pages and sheets of the job that have been executed to the row of the job history that the user name matches. If there are no rows in the counting table which matches, then a row is added. A department ID 1502 indicates which aggregation results of the department ID belong to each row. The aggregation processing unit 1102 adds each of the number of pages and sheets of the job that has been executed to the row of the job history that the department ID matches. If there are no rows in the counting table which matches, then a row is added.

Numbers of color pages 1403 and 1503 indicate the total of the number of color pages that have been printed during the aggregation period by the user or the department ID. Numbers of monochrome pages 1404 and 1504 indicate the total of the number of monochrome pages that have been printed during the aggregation period by the user or the department ID. Numbers of output sheets 1405 and 1505 indicate the total of the number of output sheets that have been printed during the aggregation period by the user or the department ID. Numbers of two-sided sheets 1406 and 1506 indicate the total of the number of two-sided sheets that have been printed during the aggregation period by the user or the department ID. Numbers of 2-in-1 pages 1407 and 1507 indicate the total of the number of 2-in-1 pages that have been printed during the aggregation period by the user or the department ID. Numbers of 4-in-1 pages 1408 and 1508 indicate the total of the number of 4-in-1 pages that have been printed during the aggregation period by the user or the department ID. High color 1409 and 1509, mid color 1410 and 1510, and low color 1411 and 1511 are the number of pages that are classified by ratios of color printing ranges in one page. It indicates the total of the number of pages that have been printed in either of high color, mid color, or low color during the aggregation period by the user or the department ID.

For example, aggregation result 1421 indicates the aggregation result of printing that the user name "yamada" has performed during period indicated by the aggregation period 1401. Similarly, aggregation result 1422 to aggregation result 1425 indicate aggregation results of printing that each of the users has performed during the period indicated by the aggregation period 1401. Also, an aggregation result 1521 to an aggregation result 1523 indicate aggregation results of printing that each of the departments has performed during the period indicated by the aggregation period 1501.

(Processing for Displaying an Aggregation Result on Touch Panel)

Figure 16A:
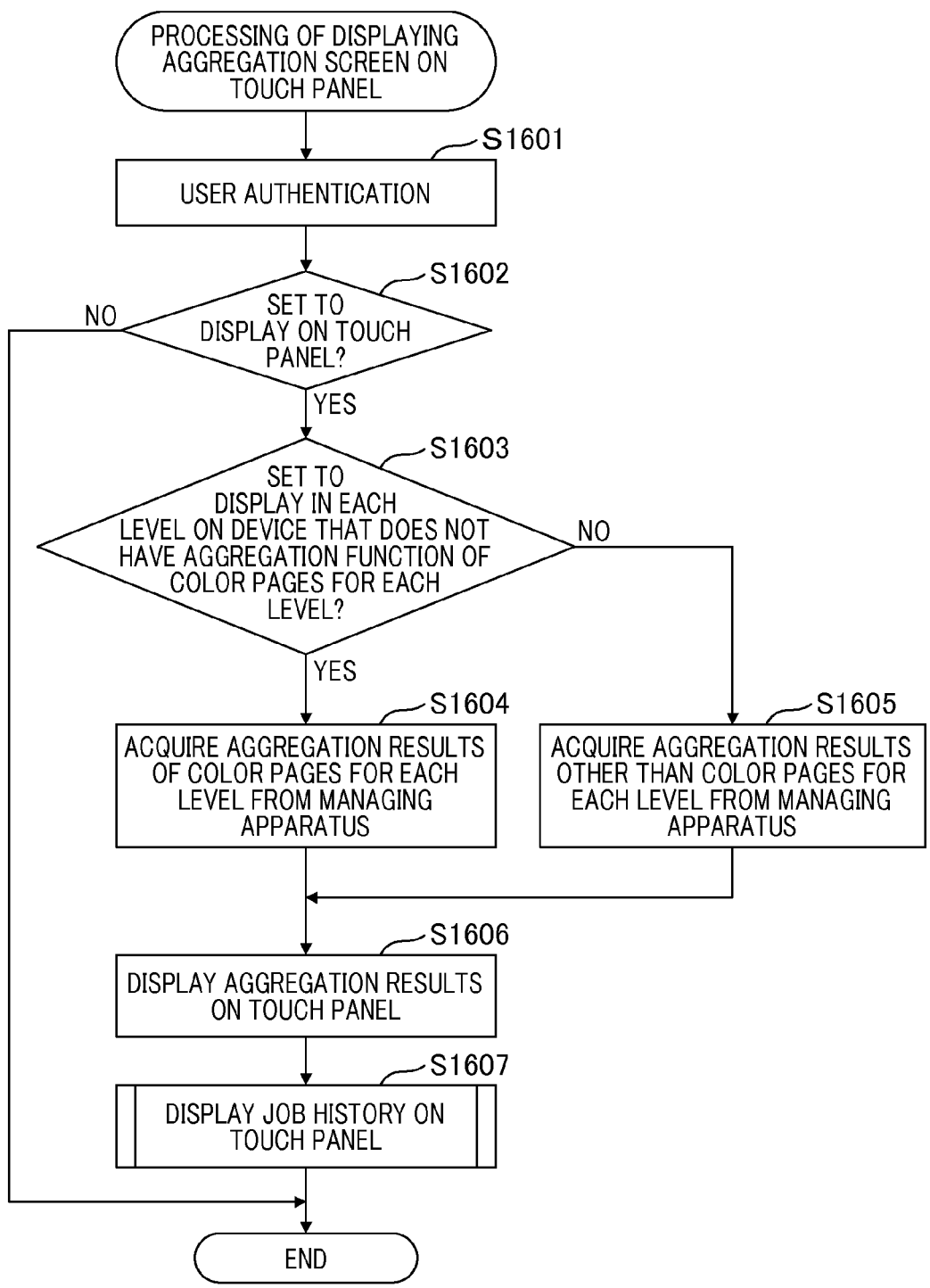
FIGS. 16A and 16B are flowcharts illustrating processing for displaying an aggregation result.
Figure 16B:
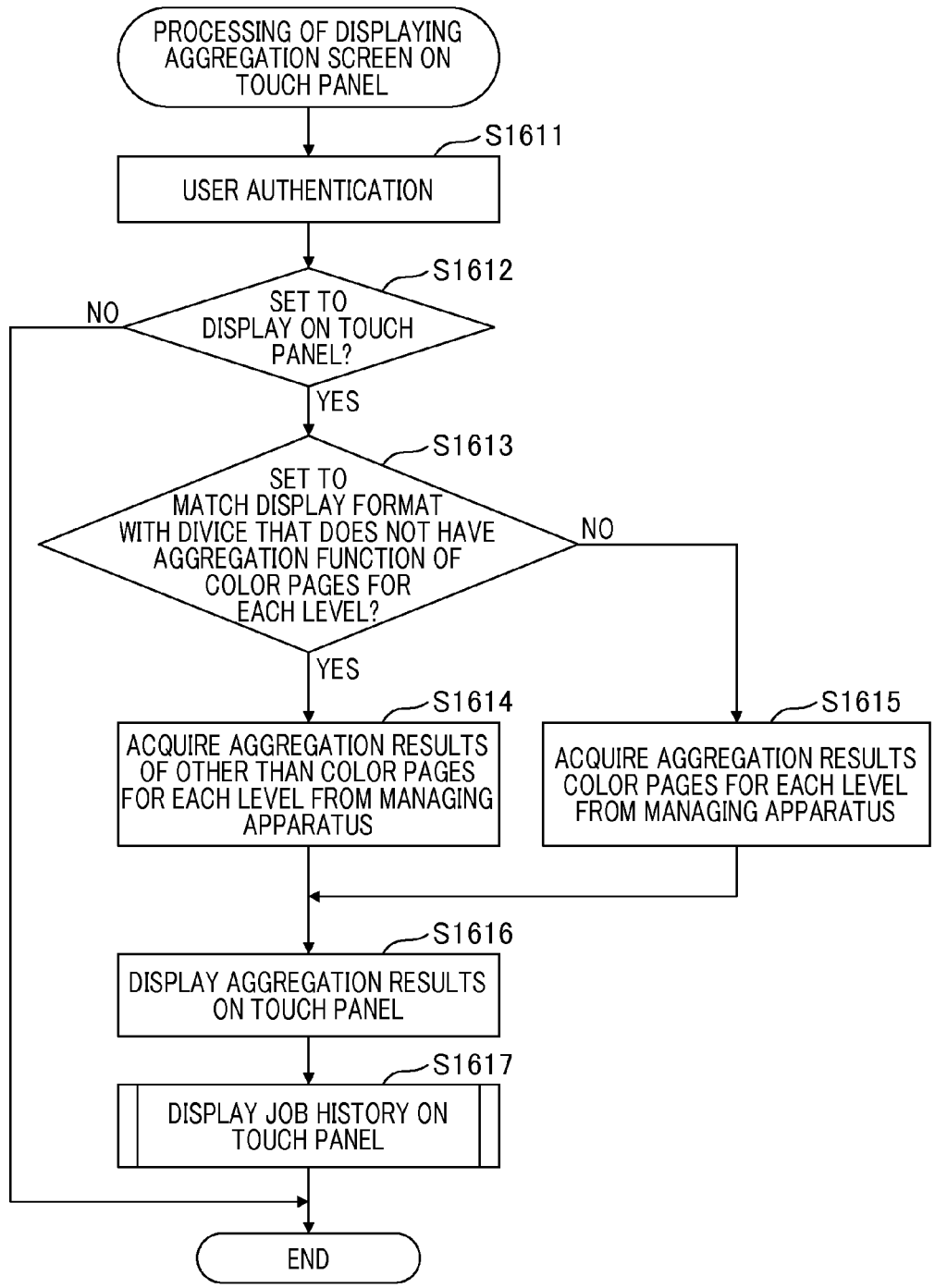

FIGS. 16A and 16B are flowcharts illustrating processing for displaying the aggregation result on the touch panel 312, which the application 208 that operates on the MFP 100 performs. FIG. 16A indicates the processing on the MFP 100 (old device), which does not have the aggregation function of color pages for each level.

Firstly, in step S1601, the application 208 performs authentication of the department ID 401 or the user name 501. More specifically, the application 208 performs the display described in FIGS. 4 and 5, and performs authentication based on the information input by the user. Next, in step S1602, the application 208 determines whether or not that the aggregation result is set to be displayed on the touch panel 312 by the MFP 100. More specifically, the application 208 determines the result of the selection of the checkbox 601 shown in FIG. 6A, which is set on the application 208. If it is set not to display (No), then the processing ends. In contrast, if it is set to display (Yes), the processing proceeds to step S1603. In step S1603, it is determined whether or not the aggregation result of only the MFP 100 (new device) that has the aggregation function of color pages for each level can be displayed on the touch panel 312 of the MFP 100 (old device) that does not have the aggregation function of color pages for each level. More specifically, the application 208 determines the result of the selection of the checkbox 602 shown in FIG. 6A, which is set on the application 208. If it is set (Yes), then in step S1604, the aggregation results of other MFPs, which include the aggregation result of color pages for each level held in the managing apparatus 901, are acquired. In contrast, if it is not set (No), then in step S1605, the aggregation results of other MFPs, other than the aggregation result for each level held in the managing apparatus 901, are acquired. Next, in step S1606, the aggregation result shown in FIG. 7 or FIG. 8 is displayed on the touch panel 312. Switching the selection of the combo box 701 shown in FIG. 7 and the combo box 801 shown in FIG. 8 enables switching the display format. Next, in step S1607, when a job history that matches a specific condition is acquired, the job history information is displayed on the touch panel 312. Note that the processing for this is described below by referring to FIG. 17.

Next, FIG. 16B indicates the processing on the MFP 100 (new device) which has the aggregation function of color pages for each level. Since step S1611 and step S1612 are similar to step S1601 and step S1602 shown in FIG. 16A, the description will be omitted.

Next, in step S1613, it is determined whether or not the display format of the aggregation result is set to match the format in which the aggregation result of color pages for each level, such as FIG. 7, is not displayed. In other words, the display format of the aggregation result is made to match the display format of the MFP 100 (old device) that does not have the aggregation function of color pages for each level. More specifically, the application 208 determines the result of the selection of the checkbox 603 shown in FIG. 6A that is set on the application 208. If it is set (Yes), then in step S1614, the aggregation results of other MFPs other than the aggregation result of color pages for each level held in the managing apparatus 901 are acquired. In contrast, if it is not set (No), then in step S1615, the aggregation results of other MFPs, which include the aggregation result of color pages for each level held in the managing apparatus 901, are acquired. Next, in step S1616, the aggregation result shown in FIG. 7 or FIG. 8 is displayed on the touch panel 312. Switching the selection of the combo box 701 shown in FIG. 7 and the combo box 801 shown in FIG. 8 enables switching the display format. Next, in step S1617, when a job history that matches a specific condition is acquired, the job history information is displayed on the touch panel 312. Note that the processing about this is described below by referring to FIG. 17.

(Processing for Displaying a Job History List on Touch Panel)

Figure 17:
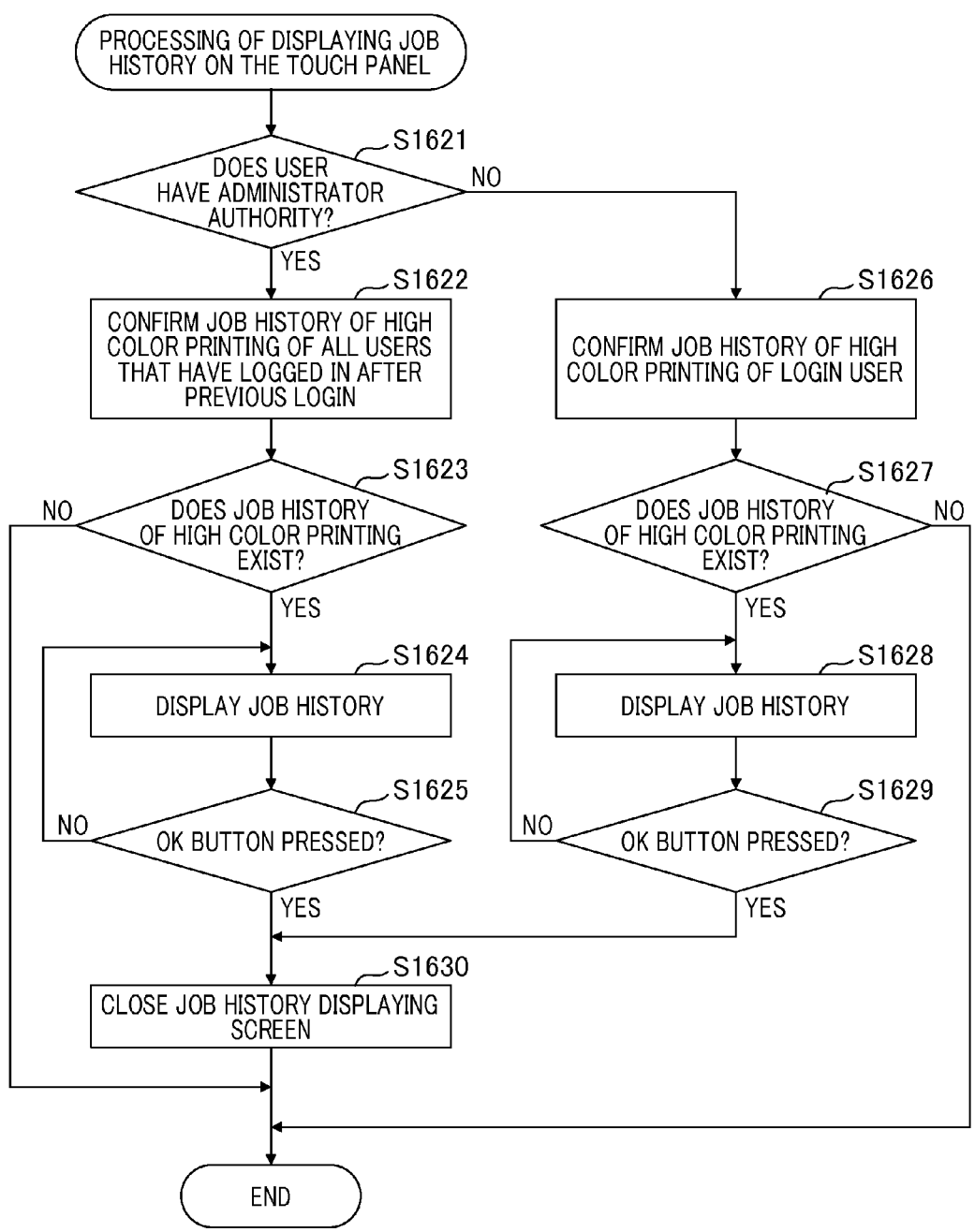
FIG. 17 is a flowchart illustrating a processing for displaying a job history of a color printing.

FIG. 17 is a flow chart illustrating a processing for displaying a job history of color printing in step S1607 or in step S1617. Firstly, in step S1621, it is determined whether or not the department ID 401 or the user name 501 acquired by the authentication processing of step S1601 (or step S1611) shown in FIG. 16A has administrator authority of the MFP 100. If the department ID 401 or the user name 501 has the administrator authority (Yes), in step S1622, the job history of printing of all users that have logged in after the previous login to the MFP 100 is confirmed to the job history managing unit 204. In the present embodiment, among the job histories that have been added after the previous login to the MFP 100, the job history of printing by high color (the specific level of color) is confirmed. Note that the time of the previous login is stored in the HD unit 1006 and the application 208 refers to the HD unit 1006.

Next, in step S1623, it is determined whether or not the job history of printing by high color exists in the job history confirmed in step S1622. If the job history of high color exists (Yes), in step S1624, a job history screen 1701 shown in FIG. 18A, which is described below, is displayed on the touch panel 312. In contrast, if the job history of high color does not exist (No), the preprocess ends. Then in step S1625, it is determined whether or not an OK button 1703 on the job history screen 1701 is pressed. If the OK button 1703 is pressed (Yes), then in step S1603, the job history screen 1701 is closed and the processing ends. In contrast, if the OK button 1703 is not pressed (No), the processing returns to step 1624 and the job history screen 1701 is displayed until the OK button 1703 is pressed.

In contrast, in step S1621, if the department ID 401 or the user name 501 does not have the administrator authority (No), then in step S1626, the job history of printing of the login user (or the department) is confirmed. In the present embodiment, the job history of printing by high color of the login user (or the department) is confirmed. More specifically, the number of high color printing pages at the time the login user (or the department) has logged in previously to the MFP 100 is "0", and the job history of printing by high color after the previous login is confirmed. Here, explaining the user counting table shown in FIG. 14 as an example, user name "oda" indicated in the aggregation result 1424 indicates that the high color printing shown in high color 1409 is "0" page. Furthermore, the counting tables for each user are recorded in other area (not shown) in the HD unit 1006 different from the high color 1409, each time when the users login.

Next, in step S1627, it is determined whether or not the job history of printing by high color exists in the job history confirmed in step S1206. More specifically, the high color 1409 is compared to the counting tables for each user recorded in other area (not shown) different from the high color 1409, which is recorded (updated) each time when the users login. Note that if the job history of printing by high color exists in the job history, the high color 1409 will be updated to the number of pages equal to or more than "1" in accordance with the number of pages of high color printing that have been performed by the object user after the previous login.

If the job history of printing by high color exists in the job history in step S1627 (Yes), then in step S1628, a job history screen 1711 shown in FIG. 18B described below is displayed on the touch panel 312. In other words, if a general user who does not have administrator authority has performed high color printing for the first time, the history screen 1711 is displayed. In contrast, if the job history of printing by high color does not exist (No), the processing ends. In step S1629, it is determined or not the OK button 1703 on the job history screen 1711 is pressed. If the OK button 1703 is pressed (Yes), then in step S1630, the job history screen 1711 is closed and the processing ends. In contrast, if the OK button 1703 is not pressed (No), the processing returns to step S1628 and the job history screen 1711 is displayed until the OK button 1703 is pressed.

Figure 18A:
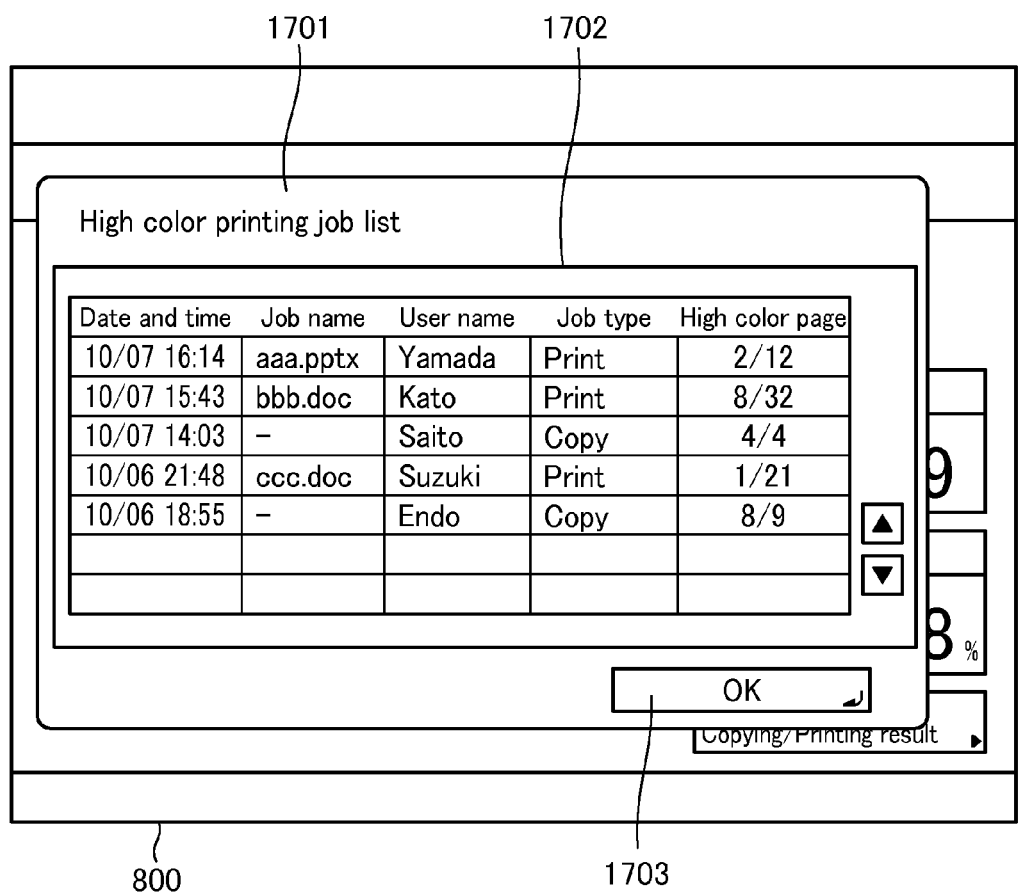
FIGS. 18A and 18B are diagrams illustrating an exemplary display of a job list screen of the color printing.

FIG. 18A is a diagram illustrating an exemplary job history list screen that indicates a job list of printing by high color when the user (or the department) that has the administrator authority has logged in. In the present embodiment, the job history list screen 1701 is displayed by a pop-up on the aggregation screen 800. The job history list 1702 displays a job completion date and time, a job name, an execution user name, a job type, and the number of pages of high color among the number of pages of the whole job. Additionally, by pressing the OK button 1703, the job history list screen 1701 is closed and the screen returns to the aggregation screen 800.

In the present embodiment, printing by high color is described, but printing by other levels in each color level (for example, mid color or low color) can be applied. Also, a combination of printing by a plurality of levels such as mid color and high color can be applied. As described above, by displaying the job history list of printing for each level at each time an administrator logs into the MFP 100, it enables easily confirming the use situation, in which some user performs some kind of color printing.

Figure 18B:
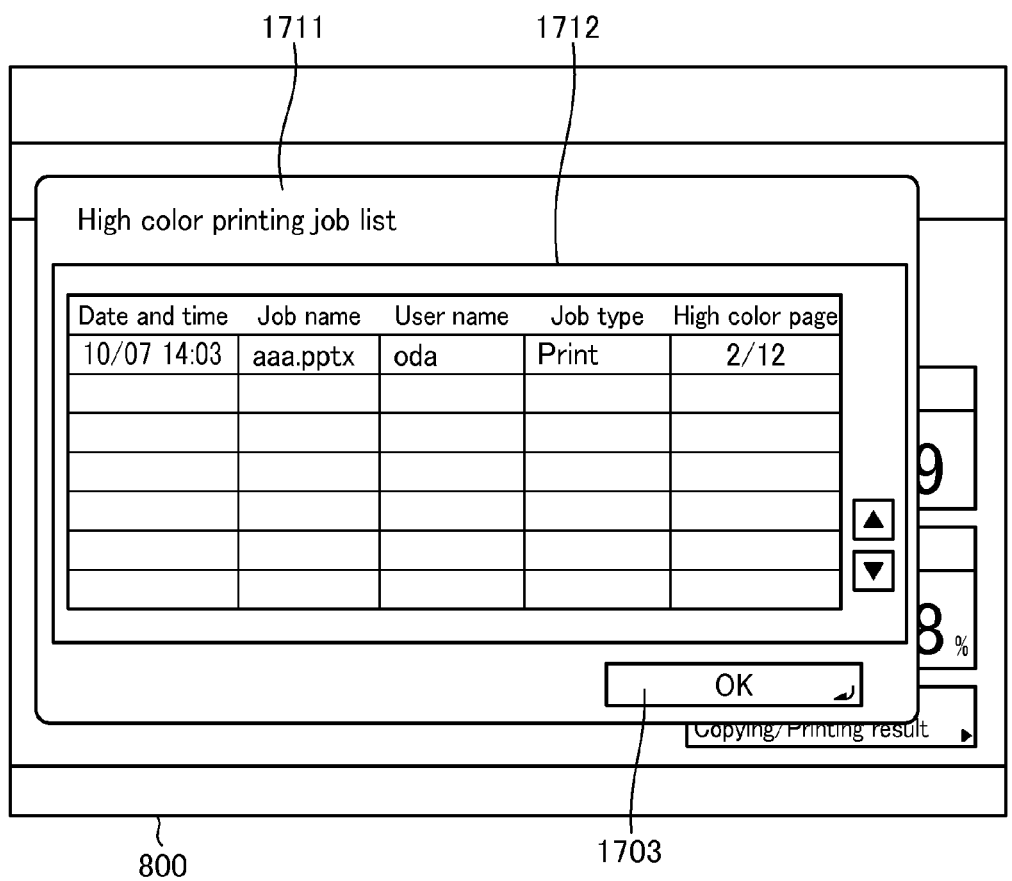

FIG. 18B is a diagram illustrating an exemplary job history list screen when the number of pages of high color printing at the time the user (or the department) that does not have the administrator authority has previously logged into the MFP 100 was "0", and the high color printing has been performed after the previous login. In the present embodiment, the job history list screen 1711 is displayed by a pop-up on the aggregation screen 800. The job history list 1712 displays a job completion date and time, a job name, an execution user name, a job type, and the number of pages of high color among the number of pages of the entire job. Additionally, by pressing the OK button 1703, the job history list screen 1701 is closed and the screen returns to the aggregation screen 800. Thus, when the general user has performed high color printing for the first time, it enables easily confirming how many pages of which job is the number of pages that has been performed high color printing.

(Processing for Displaying a Job History List Immediately after Copying on Touch Panel)

Figure 19:
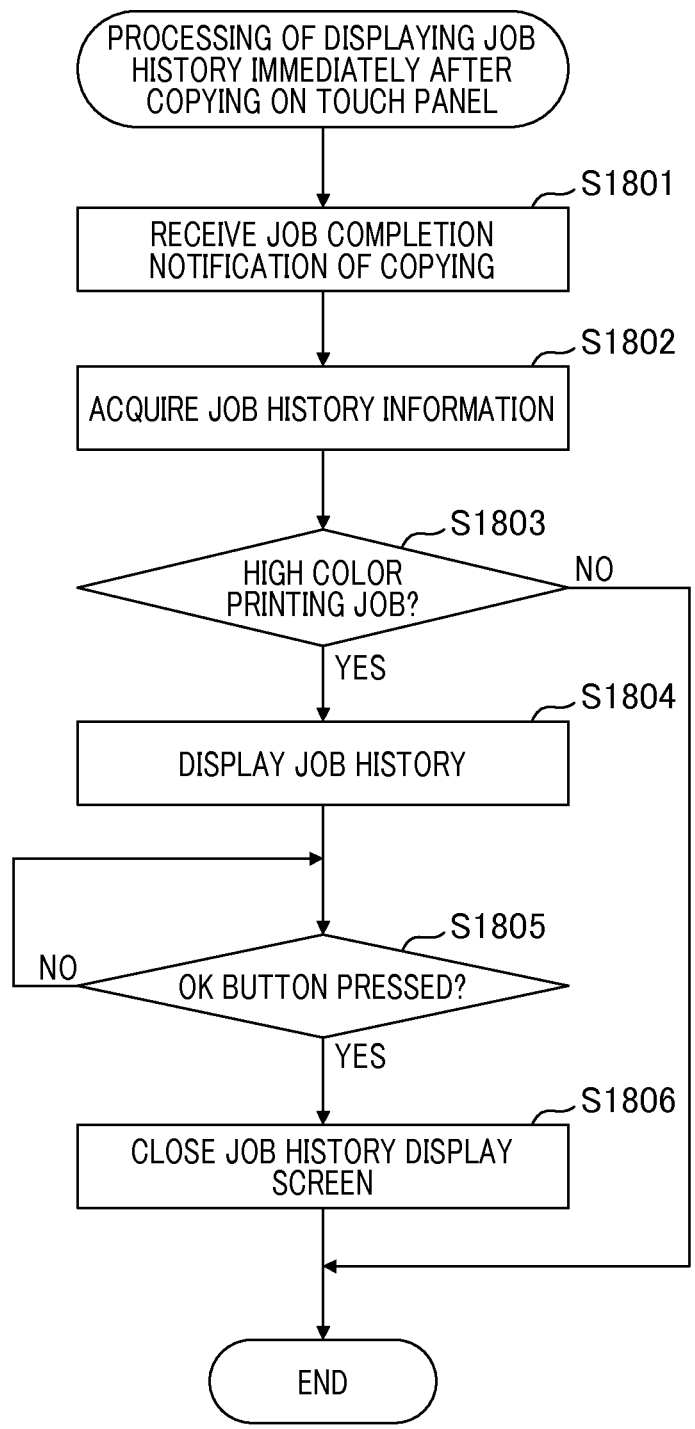
FIG. 19 is a flowchart illustrating a processing for displaying the job history immediately after printing.

FIG. 19 is a flowchart illustrating a processing for displaying the job history immediately after executing the copying function. Firstly, in step S1801, when the copying function is executed, the application 208 receives a job completion notification of copying through the API-2 (206). Next, in step S1802, the job history managing unit 204 acquires the information of the job history. In step S1803, it is determined whether or not the job history acquired in step S1802 is a job history of printing by high color.

If the acquired job history is a job history of printing by high color (Yes), then in step S1804, a job history screen shown in FIG. 20 described below is displayed on the touch panel 312. In contrast, if the acquired job history is not a job history of printing by high color (No), the processing ends. Next, in step S1805, it is determined whether or not an OK button 1903 on the job history screen 1901 is pressed. If the OK button 1903 is pressed (Yes), in step S1806, the job history screen 1901 is closed and the processing ends. In contrast, if the OK button 1903 is not pressed (No), the job history screen 1901 is displayed until the OK button 1903 is pressed. Note that in the present embodiment, the copying job is described as an example, but other than copying, any job which can be executed on the touch panel 312 among the functions of the MFP 100 can be applied.

Figure 20:
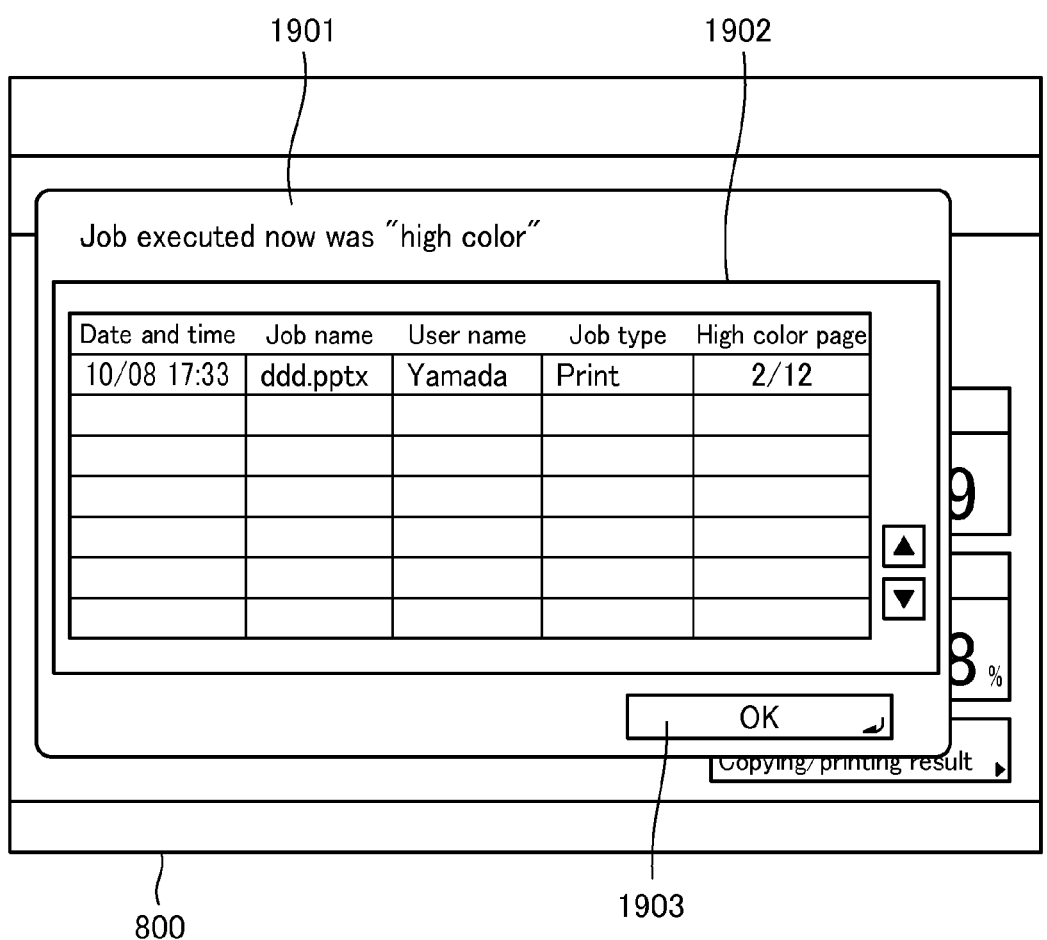
FIG. 20 is a diagram illustrating an exemplary display of the job list screen immediately after printing.

FIG. 20 is a diagram illustrating an exemplary job history screen displayed when the copying job is a high color printing job. The job history list screen 1901 displays a history when the job executed immediately before was high color printing. A job history list 1902 is a job history list and displays a job completion date and time, a job name, an execution user name, a job type, and the number of pages of high color among the number of pages of the entire job. And by pressing the OK button 1903, the job history list screen 1901 is closed and the screen returns to the aggregation screen 800.

As described above, according to the present embodiment, even if the image processing apparatuses that use different managing methods of printing output history exist together, a printing apparatus that displays the aggregation result suitable for each user, which makes the user always aware of resource saving, can be provided. Furthermore, the administrator can easily understand the use situation by displaying the job history of color printing for each level immediately after execution of printing.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-068843, filed Mar. 28 2014, and Japanese Patent Application No. 2014-264023, filed Dec. 26, 2014, which is hereby incorporated by reference wherein in its entirety.

What is claimed is:

1. A printing apparatus that manages a number of printed pages in a single color level and a number of printed pages in monochrome, comprising:
    a receiving unit configured to receive setting information related to displaying an aggregation result of a number of printed pages from a managing apparatus;
    a displaying unit configured to control displaying an aggregation result of a number of printed pages; and
    a determining unit configured to determine whether or not the received setting information indicates a first setting to display a first aggregation result of a number of printed pages of each level among a plurality of color levels on an apparatus configured not to manage a number of printed pages of each level among the plurality of color levels, wherein the displaying unit is configured to control to display the first aggregation result in response to a determination result of the determining unit.

2. The printing apparatus according to claim 1, further comprising:

an acquiring unit configured to acquire an aggregation result of a number of printed pages from the managing apparatus, wherein the acquiring unit is configured to, if the determining unit determines that the printing apparatus is the apparatus configured not to manage the number of printed pages of each level among the plurality of color levels and the received setting information indicates the first setting, acquire an aggregation result of a number of printed pages of each level among the plurality of color levels from the managing apparatus.

3. The printing apparatus according to claim 2, wherein the displaying unit is configured to, if the determining unit determines that the printing apparatus is the apparatus configured not to manage the number of printed pages of each level among the plurality of color levels and the received setting information indicates the first setting, control to display the first aggregation result acquired from the managing apparatus.

4. The printing apparatus according to claim 2, wherein the acquiring unit is configured to, if the determining unit determines that the printing apparatus is the apparatus configured not to manage the number of printed pages of each level among the plurality of color levels and the received setting information does not indicate the first setting, acquire an aggregation result of a number of printed pages in the single color levels from the managing apparatus.

5. The printing apparatus according to claim 1, wherein the displaying unit is configured to control to display the first aggregation result by ratios of the number of printed pages of each level to a total of the number of printed pages.

6. The printing apparatus according to claim 1, wherein the displaying unit is configured to control to display target values that correspond to various aggregation results set in advance in addition to the aggregation result of the number of printed pages.

7. The printing apparatus according to claim 1, wherein the displaying unit is configured to, if the determining unit determines that the received setting information indicates the first setting, control to display a job history of executed printing of a specific color level among the plurality of color levels.

8. The printing apparatus according to claim 7, wherein the displaying unit is configured to, according to a login to the printing apparatus by a user having predetermined authority, control to display a screen for providing notification about the job history of executed printing of the specific color level, which has been executed before the login, in addition to displaying the aggregation result.

9. A printing apparatus that manages a number of printed pages of each level among a plurality of color levels and a number of printed pages in monochrome, comprising:

a receiving unit configured to receive setting information related to displaying an aggregation result of a number of printed pages from a managing apparatus;

a displaying unit configured to control displaying an aggregation result of a number of printed pages; and a determining unit configured to determine whether or not the received setting information indicates a second setting to display a second aggregation result of a number of printed pages in a single color level on an apparatus configured to manage a number of printed pages of each level among the plurality of color levels, wherein the displaying unit is configured to control to display the second aggregation result in response to a determination result of the determining unit.

10. The printing apparatus according to claim 9, further comprising:

an acquiring unit configured to acquire an aggregation result of a number of printed pages from the managing apparatus, wherein, the acquiring unit is configured to, if the determining unit determines that the printing apparatus is the apparatus configured to manage the number of printed pages of each level among the plurality of color levels and the received setting information indicates the second setting, acquire an aggregation result of a number of printed pages in the single color level from the managing apparatus.

11. The printing apparatus according to claim 10, wherein the displaying unit is configured to, if the determining unit determines that the printing apparatus is the apparatus configured to manage the number of printed pages of each level among the plurality of color levels and the received setting information indicates the second setting, control to display the second aggregation result acquired from the managing apparatus.

12. The printing apparatus according to claim 10, wherein the acquiring unit is configured to, if the determining unit determines that the printing apparatus is the apparatus configured to manage the number of printed pages of each level among the plurality of color levels and the received setting information does not indicate the second setting, acquire an aggregation result of a number of printed pages of each level among the plurality of color levels from the managing apparatus.

13. The printing apparatus according to claim 9, wherein the displaying unit is configured to, according to an execution of the printing of a specific color level among the plurality of color levels by the printing apparatus, control to display a job history of executed printing, which includes the number of printed pages of the specific color level.

14. A control method for a printing apparatus that manages a number of printed pages in a single color level and a number of printed pages in monochrome, the method comprising:

receiving setting information related to displaying an aggregation result of a number of printed pages from a managing apparatus;

performing control to display an aggregation result of a number of printed pages; and determining whether or not the received setting information indicates a first setting to display a first aggregation result of a number of printed pages of each level among a plurality of color levels on an apparatus configured not to manage a number of printed pages of each level among the plurality of color levels, wherein, in the displaying, performing control to display the first aggregation result in response to a determination result by the determining.

15. A control method for a printing apparatus that manages a number of printed pages of each level among a plurality of color levels and a number of printed pages in monochrome, the method comprising:

receiving setting information related to displaying an aggregation result of a number of printed pages from a managing apparatus;

performing control to display an aggregation result of a number of printed pages; and determining whether or not the received setting information indicates a second setting to display a second aggregation result of a number of printed pages in a single color level on an apparatus configured to manage a number of printed pages of each level among the plurality of color levels, wherein, in the displaying, performing control to display the second aggregation result in response to a determination result by the determining.

16. A computer readable storage medium on which is stored a computer program for making a computer execute a control method for a printing apparatus that manages a number of printed pages in a single color level and a number of printed pages in monochrome, the method comprising:

receiving setting information related to displaying an aggregation result of a number of printed pages from a managing apparatus;

performing control to display an aggregation result of a number of printed pages; and determining whether or not the received setting information indicates a first setting to display a first aggregation result of a number of printed pages of each level among a plurality of color levels on an apparatus configured not to manage a number of printed pages of each level among the plurality of color levels, wherein, in the displaying, performing control to display the first aggregation result in response to a determination result by the determining.

17. A computer readable storage medium on which is stored a computer program for making a computer execute a control method for a printing apparatus that manages a number of printed pages of each level among a plurality of color levels and a number of printed pages in monochrome, the method comprising:

receiving setting information related to displaying an aggregation result of a number of printed pages from a managing apparatus;

performing control to display an aggregation result of a number of printed pages; and determining whether or not the received setting information indicates a second setting to display a second aggregation result of a number of printed pages in a single color level on an apparatus configured to manage a number of printed pages of each level among the plurality of color levels, wherein, in the displaying, performing control to display the second aggregation result, in response to a determination result by the determining.

* * * * *